INVENTOR.
Edwin W. De Koning.
BY
Atty.

Jan. 22, 1957  E. W. DE KONING  2,778,474
MULTIDIRECTIONAL LUMBER TRANSFER MECHANISM AND METHOD
Filed Sept. 27, 1954  2 Sheets-Sheet 2

INVENTOR.
Edwin W. De Koning.
BY
Atty.

United States Patent Office 2,778,474
Patented Jan. 22, 1957

2,778,474
MULTIDIRECTIONAL LUMBER TRANSFER MECHANISM AND METHOD

Edwin W. De Koning, Portland, Oreg.

Application September 27, 1954, Serial No. 458,475

18 Claims. (Cl. 198—19)

This invention relates to a multidirectional lumber transfer mechanism and to a method for transferring lumber rapidly and with a precise positioning of the individual boards to allow work to be done successively and in sequence, as opposed to simultaneously, upon the opposite ends of each board. In particular, the invention is concerned with the transfer of individual boards edgewise or laterally at the same time as they are moved lengthwise or longitudinally to and from successive end work stations. By an end work station I mean a mechanism or machine which performs work upon the end of a board as the board moves through the station. Examples of such end work stations in the lumber industry are printers, branders, painters, profile saws, paraffin coaters, end markers, and other machines having the common requirements that the ends of the individual boards initially must be positioned and aligned with exactness, and, thereafter, must be held in that exact alignment as the board continues to move at a constant velocity in order to allow the work to proceed effectively.

One object of my invention is to provide a mechanism and method which will effect this desired precise initial positioning and aligning and this continued exact holding, all while the individual boards are moving at a constant high speed toward, through and past the work station.

Another object of my invention is to provide the above in combination with mechanisms and methods whereby only the end of a board need be grasped while work is done thereto in order to eliminate what heretofore has been a necessity in the prior art, namely sorting to length prior to working. Thus, boards of random length, width, and thickness can be transferred and the ends worked upon with my invention while the boards continue to travel toward and past the work station at that high rate of speed which now is a necessity in the modern, high capacity lumber mills particularly in the Pacific Northwest area of the United States and Canada.

Several advantages of my invention readily are illustrated and made apparent if it be assumed, by way of example, that the transfer mechanism thereof feeds lumber from an automatically loaded trimmer saw of the type disclosed in my United States Patent Nos. 2,661,778 and 2,679,919 to a single end printer of the type disclosed in my copending application, Serial No. 459,793, filed October 1, 1954, and entitled Single End Lumber Printer. Thus, although the instant lumber transfer mechanism and method are useful with numerous and with diverse mechanisms other than printers and trimmers, they have particular utility with a single end printer which is fed from a trimmer saw and the instant disclosure will be correlated therewith.

In the production of lumber, rough boards initially are produced in random length, width, and thickness with the ends unsquared. To convert these boards to merchantable quality, to remove defective intermediate sections therefrom, and to mark the lumber with the trademark of the owner or the grade, the boards are planed, a trimmer saw is used to trim to a preselected maximum length, to square the ends, and to cut out defective sections, and a printer marks and paraffin coats the ends. There results from these operations, a high quality board which is smooth end trimmed, smooth surfaced, trademarked and/or marked with the grade and end sealed with paraffin against checking.

Since the end of World War II, the lumber industry has become increasingly competitive. Accordingly, productive capacity and speed as related to cost of production and quality of product have become of critical importance to the economic life of the lumber mill. Two recent developments illustrate this point. Firstly, automatic trimmer saws and other associated automatic equipment in the lumber mill now can handle upwards of 75 boards a minute. Other operations in the mill which are correlated thereto must, accordingly, operate at the same speed else a bottleneck will develop. Secondly, large lumber manufacturers now are marking their finished grade lumber on one or both ends with their trade-mark. These manufacturers then tie the trade-mark in with local and/or national advertising campaigns directed toward the marketing of lumber by trade-mark rather than, as previously, by a fungible goods system. The foregoing outlines the requirements of today's lumber printer and the transfer mechanism associated therewith. The printer must imprint a clear, legible trade-mark on one or both ends of a board and the transfer mechanism must feed boards to the printer in a constant stream at a speed upwards of 75 boards a minute with a precise alignment which allows the printer to mark to a uniform depth of penetration. To the best of my knowledge, these requirements heretofore have not been met in the lumber industry. The lumber transfer mechanism and method of this invention, on the other hand, do solve this problem and can feed this required number of boards with precision and accuracy to and from a single end printer.

The solution to the lumber transfer problem is not, however, one of speed alone. It also is one of direction since single end printing of random lengths requires a multidirectional transfer of the boards. Thus, the prior art of end printing lumber is exemplified by the United States Patent No. 2,047,746 of which I am assignee. Therein is disclosed a printer which simultaneously impresses a trade-mark on both ends of a board, thus applying equal and opposite forces to the two ends. This simultaneity was a requirement of the prior art since lumber printing exerts an endwise or lateral thrust of between 300 and 600 pounds in order physically to push a die into the end grain of the wood. Were both ends not printed simultaneously, the board merely would move endwise when force was applied thereto and no mark would result. The board is moving 180 to 200 feet per minute while the printing is effected and this speed heretofore has prevented holding the board during marking. The obvious disadvantage of this double end printer is that all lumber marked must first be sorted to length, the printer being capable of operating with but one length of board at a time. Recalling for a moment the competitive requirements of the lumber industry, the above defect now has become an economic fatality. Few if any mills produce but one length of board and those which do not produce a single length first have been required to sort to uniform length before applying the trademark to both ends of the boards. Sorting is done by hand and is a needless labor expense operating to the economic disadvantage of the mill. It is one object of my invention to eliminate the requirement for this sorting and thus, to eliminate the labor expense thereof.

Having in mind the above disadvantages, I have turned my inventive efforts towards the provision of a novel, high speed printer which will handle lumber of random lengths and thus will eliminate entirely the labor of sorting prior to printing a trademark. This printer per se is disclosed and claimed in my copending application Serial No. 475,793, filed October 1, 1954, and entitled Single End Lumber Printer. In brief summary, this printer functions in conjunction with a pair of hold-down rollers to print but one end of a board at a time. Thus, so long as the boards are fed endwise first to one printer and then to another, random lengths can be handled and both ends will be trademarked, successively. That is to say, the lumber need not be sorted prior to printing since but one end is printed at a time and the impressing of the mark in the end grain no longer is dependent upon the impression of an equal and opposite force on both ends of the wood. It is in conjunction with one or more of these new single end printers that the instant invention finds particular utility and in conjunction with which the advantages of the instant invention will be set forth.

My multidirectional lumber transfer mechanism moves boards longitudinally of a flat table but laterally or edgewise of the boards at a constant speed from a trimmer saw, past one or two end printers, to a final sorting or stacking chain. Since the boards are of random length, it also moves each board endwise or longitudinally a sufficient distance to align the end of the board with the printer. Where two printers are employed, the board is first moved in one direction to one printer, and thereafter, in the opposite direction to the second printer. At each printer or work station, the end of the board which is to be worked upon or printed is grasped and the board is crowded and pushed longitudinally toward the work station in preselected proportionate opposition to the longitudinal force imposed upon that end by accomplishment of the work. Thus, if the die presses into the end grain with a force of 300 pounds, the end of the board is held with an oppositely directed force of 300 pounds.

In effecting the above lumber transfer movements, it is one important object of my invention to utilize a high acceleration to gain a fast lateral transfer movement and to follow this by a step-by-step or progressive deceleration so that, as the board approaches a work station or printer, it is slowly eased into position. Thus, end damage and marring due to collision or abrupt stops are avoided.

Another object of my invention is to correlate a lumber transfer mechanism and a novel lumber guide fence such that a board is moved to an exact, precise alignment with a work station or printer. By way of example, exact and precise in the instant sense mean an alignment to within less than one thirty-second of an inch following a lateral movement of four to ten feet or more.

Yet another object of my invention is to provide a mechanism and a method for crowding and pushing a board longitudinally toward a work station or printer in preselected proportionate opposition to the longitudinal force imposed upon the end of the board by the accomplishment of the work or the impression of the printer die, all by grasping only that end of the board which is being worked or printed. This crowding and pushing thus allows the working or printing of random lengths of lumber.

Still another object of my invention is to provide a mechanism and a method for transferring lumber in a direction which is the resultant of a constant longitudinal component of speed and a variable lateral component of speed, all without physical marring of or damage to the board, with sufficient speed to take the full output of an automatic trimmer or similar highspeed automatic mechanism, and with a precision of positioning to within less than one thirty-second of an inch.

The above and other desirable objects, capabilities, and advantages inherent in and encompassed by the multidirectional lumber transfer mechanism and the method of the present invention will become apparent from the ensuing description, taken in conjunction with the accompanying drawings, wherein.

Figure 1:
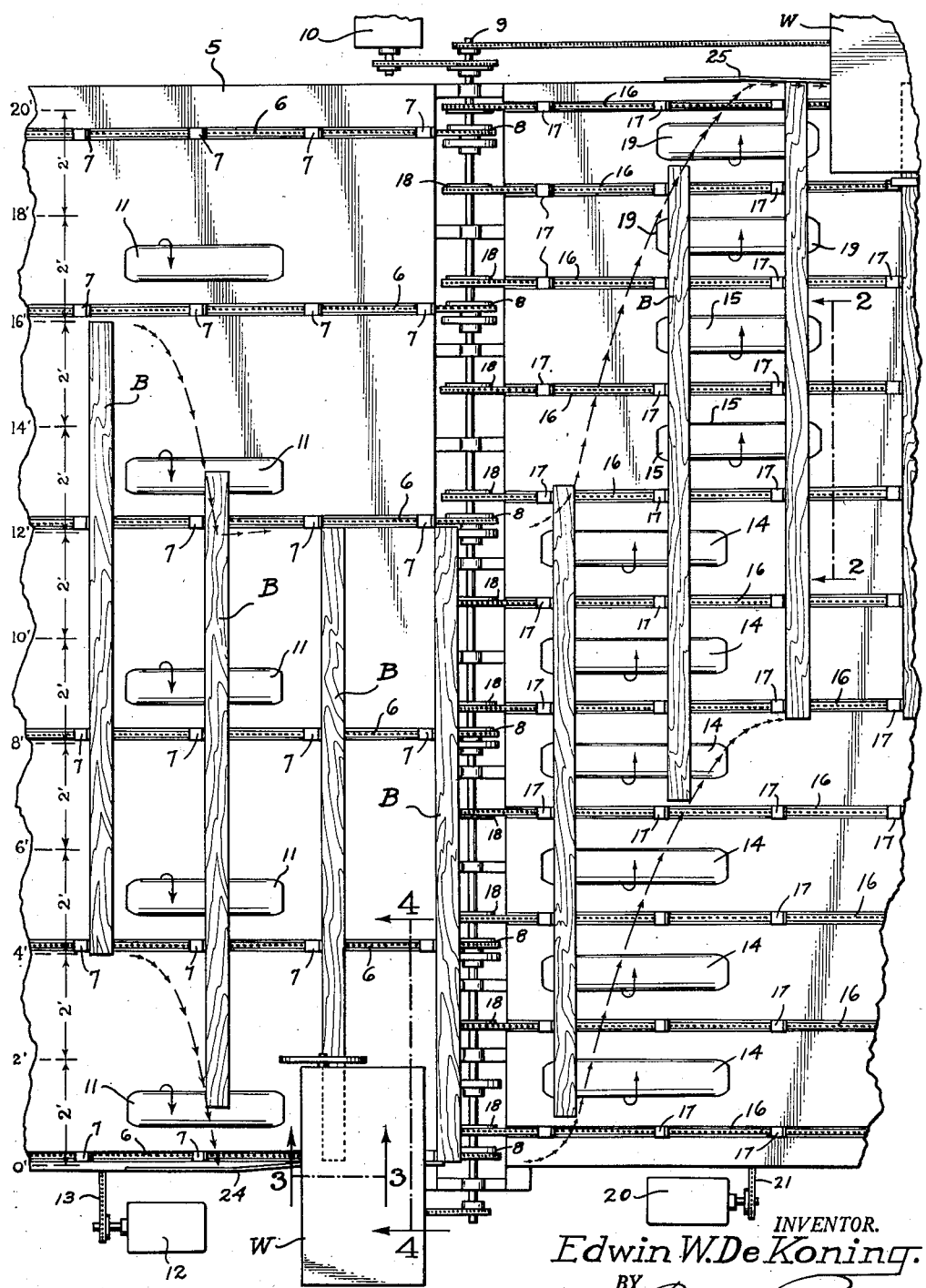
Fig. 1 is a combination plan view and flow diagram of my multidirectional lumber transfer mechanism, a number of individual boards being shown in progressive and sequential positions across the mechanism and the movement or flow of the boards being indicated diagrammatically by direction arrows.
Figure 4:
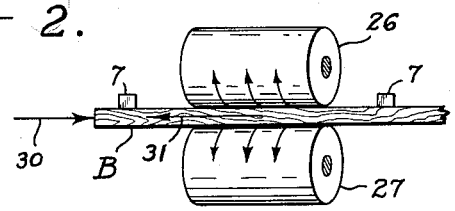

Fig. 4 is a somewhat diagrammatic cross section detail, taken substantially on the line 4—4 of Fig. 1, wherein arrows are utilized to indicate directions of rotation and forces which act upon the end of a board in order to crowd and push the board longitudinally toward the work station or printer in preselected proportionate opposition to the longitudinal force which is imposed upon that end by application of the work or impression of the die.

Fig. 1 is a flow diagram combined with a plan view looking down upon the top of a table 5 with which the various elements of my lumber transfer mechanism are associated. In this figure, a number of boards B are shown in various positions across the table top 5. Additionally, it will be noted that both the left and right edges of this drawing are foreshortened. These indicate that my lumber transfer mechanism may be associated with various other mechanisms within a high speed lumber mill. For example, the flow of boards across Fig. 1 is from left to right and the left edge of the illustrated mechanism may be joined to a trimmer saw. Trimmer saws generally are of two types. An "automatic" trimmer saw is one which receives boards and squares the ends while trimming to an exact preselected length and a "selective" trimmer is one which, in addition to the above function, may be used simultaneously to remove defective intermediate sections such as large pitch pockets, broken sections, open knotholes, and the like.

Along the left edge of Fig. 1, there are indicated a number of two-foot intervals. These intervals correspond to the spacing of the saws in either an automatic or a selective trimmer. Assuming that it is a selective trimmer which is illustrated, a saw is located at each of the two-foot stations from 0 to 20 feet. Lumber transfer chains move individual boards edgewise past these saws where the ends are squared and defective intermediate sections are cut out. In Fig. 1, the feed chains 6 may be off bearing feed chains from such a selective trimmer and the board B which is closest to the left edge of the drawing is being carried by this feed chain immediately after four feet has been trimmed from its lower end to eliminate a defect and its upper end has been squared at the 16 foot saw. The resultant board is 12 feet long and must be moved endwise four feet before the end thereof can be printed or otherwise worked upon.

To the right in Fig. 1, the foreshortening line may indicate, by way of example, that the lumber transfer mechanism precedes either a sorting chain from which the lumber is piled for delivery, or, in the Pacific Coast fir mills, from which the lumber is fed to a planer. In the latter cases, it is the practice to sort lumber to length prior to delivery to the planing mill for manufacture.

Turning now to the structure which is intermediate the two sides of Fig. 1, I have indicated at W a work station which may be a printer, brander, painter, profile saw, paraffin coater, end marker, a combination of these, or any other machine or mechanism which works on the end of a board. For purposes of illustration, the work station W hereinafter will be referred to as a printer of the single end type disclosed in my co-pending application previously identified. Thus, two of these work stations W are shown in Fig. 1 spaced longitudinally of the table 5 intermediate the ends and adjacent the opposite sides thereof. These work stations perform the desired work upon the end of a board, such as impressing and printing a trademark in the end grain of a board, while the board flows past the work station, from left to right in Fig. 1, at a speed of upwards of 75 boards a minute. The lumber transfer mechanism of the instant invention feeds the boards to the work stations W with precision and accuracy in a steady stream as now will be described.

To the above end, the feed chains 6 carry lugs 7 which protrude above the plane of the horizontal table 5. These chains and lugs are driven from sprockets 8 which are keyed in common to an elongated shaft 9 with similar and identical sprockets 18. These latter sprockets, in turn, drive another plurality of parallel chains 16 which carry lugs 17 protruding above the plane of the table 5. A common electric motor 10 operates the elongated shaft 9 so that the lugs 7 and 17 are caused to travel at identical speeds which, for the purposes of the instant disclosure, may be in the vicinity of 180 to 200 feet per minute. It is the function of all of these chains and lugs to provide a constant and a uniform speed laterally of the boards B but longitudinally of the table 5 and the mechanism of the work station conventionally is joined thereto for concurrent operation as shown in the drawings.

Returning to the left side of Fig. 1, a plurality of rollers 11 are mounted preferably with the rotational axes thereof parallel the longitudinal dimension of the table 5. These rollers project above the plane of the table 5 but to a lesser height than the projection of the lugs 7. Rotation is imported to the rollers 11 by an electric motor 12 having a drive sprocket which turns a chain 13 geared in common or in series to sprockets carried by each of the rollers 11. By making each driven sprocket identical in size, the rollers 11 will be caused to rotate at the same speed and this is the preferred embodiment of my invention. On the other hand, these driven sprockets may be varied in size to impart varying rotational velocities to the rollers 11 if such is desired in a particular installation.

Figure 2:
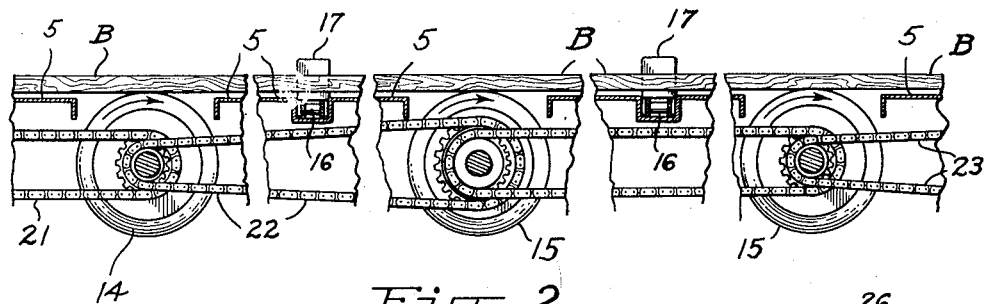
Fig. 2 is a foreshortened cross section detail, taken substantially on the line 2—2 of Fig. 1, showing the relative variance in sprocket size of the lateral drive rollers whereby individual ones of the rollers rotate at different speeds.

Turning now to the right half of Fig. 1, a second plurality of rollers 14, 15, and 19 are shown. All of these rollers also preferably are provided with rotational axes which are parallel the longitudinal dimension of the table 5 and each projects above the top surface of the table to a lesser height than the projection of the lugs 17. I have ascribed separate reference numerals to the six rollers 14, the two rollers 15 and the two rollers 19 because, in one form of my invention, these rollers are driven at different rotational velocities. This variance in velocity may be accomplished either by separate drives or, as shown in the drawings, by a common drive motor 20 having a drive sprocket which rotates a chain 21. The six rollers 14 carry equal size driven and drive sprockets about which the series of chains 21 are reeved so as to cause each of these rollers to rotate at the same speed. Referring to Fig. 2, on the other hand, a different chain 22 in the series interconnects the last of the rollers 14 and the first of the rollers 15. This chain is reeved about a small sprocket carried by the roller 14 and a larger sprocket carried by the roller 15 as shown in Fig. 2. Accordingly, the roller 15 will be driven and will rotate with a somewhat slower speed than the roller 14. In similar manner, the two rollers 15 of Fig. 2 carry identical size driven and drive sprockets so as to rotate at the same speed. Progressing from the roller 15 to the right edge of Fig. 2, a separate chain 23 in the series again is reeved bout a smaller drive sprocket and a larger driven sprocket so as to impart a yet slower rotational speed to the two rollers 19. Since the flow of boards through the lumber transfer mechanism is past the lower work station W firstly and, thereafter, past the upper work station W, secondly I choose to term the first of these a first work station and the second a second work station. With reference to these terms, the motor 20, chains 21, 22 and 23, together with the sprocket mechanisms associated therewith, may be defined as a drive means common to all of the rollers 14, 15, and 19 for rotating those rollers closest to the first work station W at a high velocity, those closest to the second work station W at a low velocity, and those intermediate thereto at an intermediate velocity.

It is, of course, the function of the rollers 11 to move a board endwise toward the first work station and of the rollers 14, 15, 19 to move a board endwise toward the second work station. In conjunction therewith, a lumber guide fence 24 is located adjacent the first work station and a similar guide fence 25 is located adjacent the second work station. Both of these guide fences project above and along the edge of the table from a point opposite the corresponding rollers to a point adjacent the corresponding work station in order to stop longitudinal movement while guiding a lateral movement of a board toward the corresponding work station. If desired, these fences may have a slight inward bend designed to nudge boards gently endwise into a precise and exact final alignment position when the boards B are fed from an automatic rather than a selective trimmer saw. In any event, it is the function of each fence to guide the end of the board as the latter slides therealong toward the corresponding work station. Thus, the fence 24 preferably is located in alignment with the zero saw of the trimmer saw in definition of a zero reference line longitudinally of the table 5.

Figure 3:
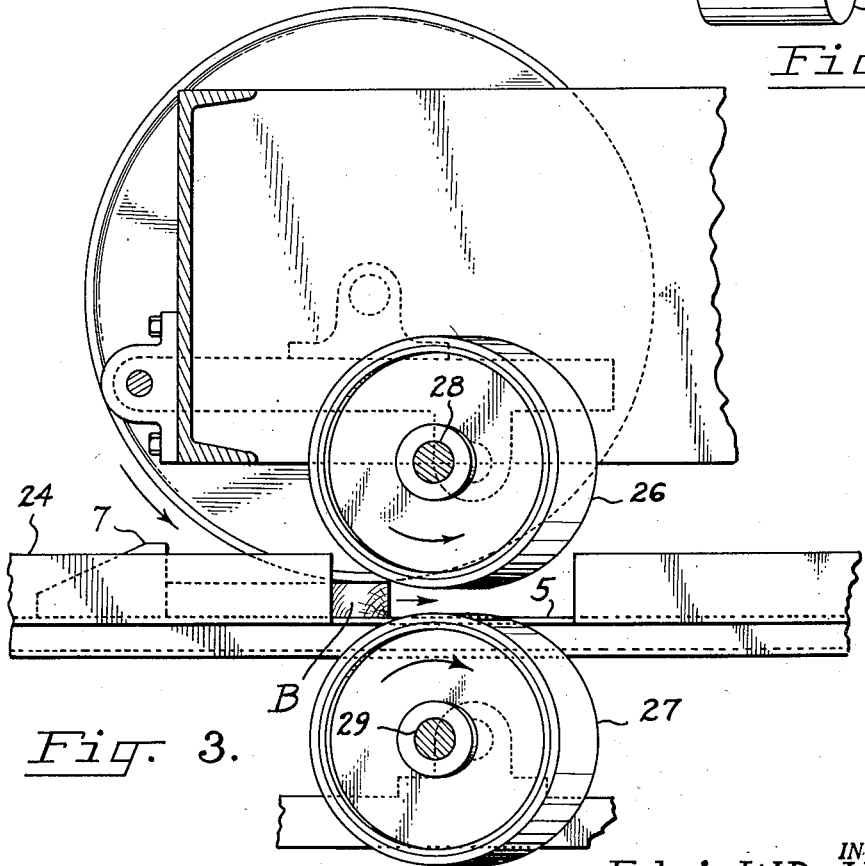
Fig. 3 is another cross section detail, taken substantially on the line 3—3 of Fig. 1, showing the end of a board about to pass through a work station at which the end of the board will be grasped and restrained against longitudinal movement while the constant feed of the board through the work station continues.

Fig. 3 is an enlarged detail view taken substantially on the line 3—3 of Fig. 1 in order to disclose the means by which the end of a board is grasped and crowded or pushed longitudinally in preselected proportionate opposition to the longitudinal force imposed thereon by the accomplishment of the work at the work station W. Thus, Fig. 3 illustrates the manner in which a pair of opposed rollers 26 and 27 are mounted upon spaced parallel idler axles 28 and 29, respectively. The axles 28 and 29 purposely are disposed at an oblique angle and are canted somewhat toward the outboard edge of the table 5 yet are parallel the plane of the upper surface thereof. That is to say, these axles are disposed so that the rollers 26 and 27 are obliquely inclined to move a board endwise toward the edge of the table. Additionally, the peripheries of the rollers 26 and 27 are spaced a preselected and a variable distance which in each case is somewhat less than the thickness of a board B. The rollers are coated with a rather soft rubber in order to provide a yielding, pliable surface frictionally to grip and grasp the opposite faces of a board which is fed between the rollers as shown in Figs. 3 and 4. In Fig. 1, the rollers 26 and 27 are located within the box-like outline of the work stations W and, to this extent, they are a portion of these work stations. They are not, however, driven. Instead, they idle and it is a passing board which causes them to rotate. In function, a pair of the rollers 26, 27 is located at each work station where they serve to grasp the end only of a passing board and to restrain longitudinal movement thereof while permitting a lateral movement. The degree of force which is exerted by the rollers is determined by the weight of the roller and associated mechanism and by other spring, weight, or other type hold down mechanism which may be added thereto. One particular type of hold down mechanism is disclosed in my aforementioned co-pending application for a single end lumber printer. In any event, the remainder of the mechanism illustrated in Fig. 3 is unimportant to an understanding of the instant invention and reference should be had to the aforementioned co-pending application where the work done at the work stations W is to be the end printing or marking of lumber. That is to say, the rollers 25 and 26 will grasp the end of a board and crowd and push it longitudinally toward the work station W irrespective of the type of work which is performed upon the end of the board. Additionally, by varying the spacing or the surface area or the weight of the rollers or by varying the vertical force exerted.

thereon, this opposition to longitudinal movement of the board can be preselected and can be varied in accord with the work which is to be and is accomplished at the work station W so that equal and opposite forces are generated.

*Operation*

In operation, upwards of 75 boards a minute flow from left to right across the mechanism shown in Fig. 1 of the drawings. For purposes of illustration, the boards may be leaving a trimmer saw at the left and, where this trimmer saw is of the selective type, the lengthwise dimension of the boards will vary over a wide range. For example, several boards may pass through the trimmer saw without defects or broken sections therein. The right end of these boards (that end which is lowermost in Fig. 1) will be trimmed by the zero saw and the left end will be trimmed at a point giving the maximum possible length. At other times, a board may have defects adjacent either or both ends thereof. For example, the board B which is nearest the left hand side of Fig. 1 had an imperfection at the right or lower end which required that the operator of the trimmer saw trim four feet from this right end. Accordingly, the right end is four feet away from the zero or alignment mark as the board enters the transfer mechanism. A four-foot cut is normally the largest cut ever taken from the right end of a board. The more normal operation is for few of any cuts to be required at the right end of the board although some two-foot cuts may be necessary. Thus, I have shown an extreme case to illustrate the versatility of the mechanism. As those skilled in the art will appreciate, the diversity of initial board lengths combined with the various cuts which may be required, generates what is termed in the industry "random lengths" and my lumber transfer mechanism is adapted to handle these random lengths with speed and accuracy.

Boards are carried from the trimmer across the smooth flat surface of the table 5 by the spaced contact of the lugs 7 with the edge of the boards. As they move to the right, these lugs 7 carry the board B up and over the projecting periphery of the rollers 11 whereupon longitudinal or endwise movement is imparted to the board. In Fig. 1, these movements of the board are shown by direction arrows which are the resultant of a constant speed laterally of the board and longitudinally of the table and of varying speeds endwise or longitudinally of the board and laterally of the table. Thus, as a board is moved up onto the peripheries of the rollers 11, the surfaces of which preferably are smooth so as not to mar the wood, the board picks up speed in a longitudinal direction and moves toward the fence 24. The fence 24 stops this longitudinal movement of the board and the lugs 7 carry the right end of the board into the area of the first work station W.

Referring now to Figs. 3 and 4, the end of a board B can be seen entering a work station area or printer where it is grasped by the obliquely disposed idler rollers 26 and 27. Thus, the lugs 7 push the board between and through these rollers the function of which is to oppose the force generated upon the end of a board while work is done thereto. In Fig. 4, the force of the work which is exerted upon the end of a board is indicated by a direction arrow 30 and the opposing force which is generated by the oblique disposition of the rollers 26 and 27 is indicated by a similar arrow 31. By varying the spacing of the rollers 26 and 27 and by varying the yieldable force which holds these rollers together, the forces 30 and 31 can be made equal and opposite so the board will not move longitudinally away from the work station W but instead will pass therethrough in a preselected alignment. The force which is represented by the arrow 30 may, of course, be the force exerted by a profile saw, a paraffin coating wheel or a printing or marking die as the latter is pressed into the end grain on a board to mark and print a trademark therein. Where the boards B are pine wood, which wood is somewhat softer than fir, these opposing forces are in the vicinity of 300 pounds utilizing a $\frac{1}{16}$ inch bold face printing or marking die. Other work mechanisms will require other forces and the printer is but exemplary of the uses to which the lumber transfer mechanism can be put.

Returning to Fig. 1, as a board B leaves the first work station W, it is picked up by the lugs 17 carried by the chain 16. These lugs travel at the same speed as do the lugs 7 so as to impart a constant lateral velocity to the boards all the way across Figure 1. Progressing toward the right, the lugs 17 move the boards up onto the protruding peripheries of the rollers 14. These rollers rotate at a high speed to move the board endwise or longitudinally toward the second work station W and fence 25. However, as the board moves both endwise and laterally, it is moved up and onto the surface of the rollers 15. These latter rollers rotate at a somewhat slower speed than the rollers 14 so as to slow down the movement of the board toward the fence 25. Similarly, as the board is carried over to the rollers 19, it is slowed even more since these are the slowest rollers illustrated in Fig. 1. In actual operation, a board moves as shown by the direction arrows in the right half of Fig. 1 first at a high velocity, then a an intermediate velocity, and, lastly, at a low velocity where it is eased up against the fence 25. This variable longitudinal speed which increases rapidly and decreases slowly to zero as the board approaches the fence and work station W is an important feature of my invention since it prevents marring and physical damage to the end of the board. That is to say, were the board B moved by high velocity rollers the eight foot distance illustrated, it would pick up considerable speed by the time it passed the last roller. This would cause a collision with the fence 25 and the end of the board then would be splintered, crushed, marred or otherwise damaged. Sometimes a short board is required to move 10 or 12 feet across the table and this movement must be accomplished in a very short time during a lateral or edgewise movement of perhaps five feet. This short time interval and distance require a high velocity yet the board must not collide with the fence 25 while moving a a high velocity. Accordingly, the rollers 14 rotate at a high velocity, the rollers 15 at an intermediate velocity, and the rollers 19 at a low velocity so as to ease the board up against the fence 25.

As the lugs 17 continue to push the board toward the second work station, a second series of rollers 26 and 27 identical with the first set, grasp the end of the board and, once again, work is accomplished upon the end of the board while the rollers maintain the endwise alignment and accuracy. After leaving the second work station, of course, the board may be transported to any end point of use such as a sorting chain.

*Diverse installation*

It now will be apparent that my multidirectional lumber transfer mechanism can be utilized in conjunction with various other mechanism and in conjunction with diverse end work mechanisms located at the work stations W. For example, it is possible to profile saw one or both ends, to print one or both ends of a board, to print and paraffin coat one end, to print and paraffin coat both ends, to paraffin coat without printing one or both ends, or other combinations and permutations of these and other mechanisms. In some installations, a single end printing and/or paraffin coating may be accomplished at a single work station W. In this case, of course, either the set of rollers 11 or the rollers 14, 15, 19 are eliminated together with the work station fed thereby. In other installations, automatic trimming is accomplished without the selective cutting away of defective intermediate sections. When the lumber transfer mechanism of Fig. 1 follows such a trimmer, the rollers 11 may be dispensed with since the right end of the board always will be located in a precise exact position at the zero saw station even with the fence 24 each and every time. Thus, I prefer to manufacture and to sell my lumber transfer mechanism in accord with various so-called "plans." The first of these plans provides a single end work station together with a single set either of the rollers 11 or the rollers 14, 15, 19. The second of these plans calls for double work stations W located at opposite sides of the table together with a single set of the rollers 14, 15, 19 or 11 located intermediate the two work stations. The third plan is as illustrated in Fig. 1 and the fourth plan is with a single work station W either with or without either set of rollers. I intend that the scope of my inventive concept will cover each and every one of these various plans or arrangements as defined by the claims.

Method

In addition to the above described mechanism, I also provide a novel method for the rapid transfer and precise positioning of lumber to allow precision work to be done successively and in sequence (as opposed to simultaneously) upon the opposite ends of each board while the board is moving. In practice of this method, the mechanism disclosed in Figs. 1 to 4 inclusive may be utilized or, optionally, the boards may, of course, be moved by other mechanism or by hand. That is to say, the illustrated mechanism is the preferred mechanism but is not the only mechanism for the practice of the method. In explanation of this method, the steps are practiced in sequence somewhat as follows: Progressing from left to right in Fig. 1, a board is moved laterally at a constant speed and longitudinally at a variable speed which decreases to zero as the board meets the fence 24 and approaches the first work station W. While continuing at the constant lateral speed imposed thereon by the lugs 7, the end of the board is grasped, as by the rollers 26 and 27, to result in a crowding and pushing of the board longitudinally toward the work station in opposition to the work force as illustrated by the opposed arrows 30 and 31 in Fig. 4. Since the force applied by the rollers 26 and 27 can be varied in accordance with the force which is necessary to oppose the force 30, the crowding and pushing of the board longitudinally toward the station can be effected in preselected proportionate opposition to the longitudinal force opposed upon that end by the accomplishment of the work. There thus is inhibited any longitudinal movement away from the station by the board B. Where two work stations W are provided, the constant lateral speed of the board is continued by the lugs 17 after the grasp of the first set of rollers 26 and 27 is released. Thereinafter, the board is moved longitudinally in a direction opposite to the previous longitudinal movement by the rollers 14, 15, 19. This latter longitudinal movement is at a variable longitudinal speed which increases rapidly as the rollers 14 take effect and decreases slowly to zero as the rollers 15 and 19 take effect as the board approaches the second work station W. Thereinafter, the end of the board is guided by the fence 25 and, while continuing the constant lateral speed by the movement of the lugs 17, the second end of the board is grasped by the second set of idler rollers 26, 27. These latter rollers crowd and push the board longitudinally toward the second work station. Here again, the crowding and pushing are in preselected proportionate opposition to the longitudinal force imposed upon that end by the accomplishment of the work and are effected in order to inhibit longitudinal movement of the board away from the second work station. Finally, after the work at the second station is completed, the board is moved away at a constant lateral speed when the grasp of the second set of rollers 26 and 27 is released.

I have determined that the above described method is capable of definition in various terms. For example, the constant speed of the lugs 17 and the variable speed of the rollers 14, 15, 19 may be defined as a method step movement of the boards laterally at a constant speed while, at the same time, moving each board longitudinally at a speed which varies, sequentially, with high acceleration from zero adjacent the first work station to a preselected high speed and, with low deceleration, back to zero adjacent the next work station so as to prevent physical damage to the boards during said deceleration. Similarly, these sequential movements and steps may be defined as moving a plurality of boards at preselected constant intervals spaced one from another laterally at a constant speed while, at the same time, giving thereto the following longitudinal movement sequentially; acceleration to high speed travel in a first direction followed by deceleration to zero velocity, and, after a preselected interval, acceleration to high speed travel in the opposite direction followed by step-by-step deceleration to an intermediate speed, a low speed, and, finally, to zero velocity. This latter definition of my method illustrates a method which will serve two work stations W and which can be practiced with both the rollers 11 and the rollers 14, 15, 19.

In summary, it will be seen that I have provided both a mechanism and a method for the multidirectional transfer of lumber with precision and rapidity to and from one or more work stations. This mechanism and method effect the desired precise initial positioning and alignment and the continued exact holding of a board while the board continues to move at a constant velocity. Additionally, since only the end of the board is grasped by a work station, boards of random length, width, and thickness can be transferred and worked upon all at that high rate of speed which now is a necessity in the modern high capacity lumber mills of the Pacific Northwest regions of the United States and Canada. In actual use, the disclosed mechanism can handle upwards of 75 boards a minute expeditiously, accurately and without marring, crushing or other damage.

I claim:

1. A lumber transfer mechanism, comprising an elongated table top having a first end and a second end, longitudinal means adjacent one edge of said table top defining a zero reference line, first conveyor means for moving an elongated board edgewise in a direction parallel said reference line from said first to said second end at a continuous constant velocity, second conveyor means intermediate said table ends for moving said board endwise across the table to a position with the terminal end of the board aligned with said reference line, and means intermediate said second conveyor and said second table end for crowding and pushing said board endwise with a preselected force.

2. A lumber transfer mechanism as in claim 1 wherein said last named means includes at least one roller having a yieldable periphery means frictionally for gripping the surface of said board adjacent that end only which is aligned with said reference line.

3. A lumber transfer mechanism as in claim 2 wherein said roller is an idler mounted for free rotation about an axis parallel said table top but disposed at an oblique angle to both the longitudinal and the lateral dimension thereof with the periphery of the roller spaced from the table top a distance less than the thickness of said board.

4. In combination with an elongated table, means for moving a plurality of elongated boards of random length, width and thickness laterally of the boards but longitudinally of the table at a constant speed between a first position adjacent one end of said table and a second position adjacent the opposite end thereof, work station means located intermediate said first and second positions for grasping the end only of a passing board and restraining longitudinal movement while permitting lateral movement thereof, longitudinal conveyor means formed in independent successive sections and located intermediate said first and second positions for moving a board longitudinally towards said work station, and means for varying the relative speed of successive sections of said longitudinal conveyor means initially to move a board rapidly and finally to move a board slowly longitudinally.

5. A lumber transfer mechanism, comprising an elongated table top, means for moving plural elongated random length, width and thickness boards edgewise in a direction longitudinally of the table at a constant speed between a first position adjacent one end of said table and a second position adjacent the opposite end thereof, work station means located intermediate said first and second positions for grasping the end only of a passing board and imposing a preselected longitudinal force thereon while permitting lateral movement thereof, guide fence means terminating adjacent said work station for stopping longitudinal movement and guiding lateral movement of a board toward the work station, and longitudinal conveyor means operative at a constant speed and located intermediate said first position and first work station for moving a board longitudinally toward said work station.

6. In combination with an elongated table top, constant speed conveyor means movable longitudinally of the table at a constant speed between a first position adjacent one end of said table and a second position adjacent the opposite end thereof, first and second work station means spaced longitudinally of said table and located intermediate said first and second positions adjacent the opposite sides of said table successively for imposing a preselected force upon the opposite ends only of a passing elongated piece of material and restraining longitudinal movement while permitting lateral movement thereof, first and second guide fence means bounding portions of the opposite sides of said table and terminating adjacent said first and second work stations, respectively, for stopping longitudinal movement and guiding lateral movement of said piece of work toward the corresponding work station, first lateral transfer means operative at a constant speed and located intermediate said first position and first work station for moving said piece of work longitudinally toward said first fence means, second lateral transfer means formed in independent successive sections and located intermediate said first and second work stations for moving said piece of work longitudinally towards said second work station, and means for varying the relative speed of successive sections of said second longitudinal conveyor means initially to move the piece of work rapidly and finally to move it slowly longitudinally toward said second work station.

7. In combination with the off-bearing lumber transfer chains of a smooth end trimmer saw, an elongated table across which said chains move, said table having first and second ends, drive means for moving said chains at a constant velocity, work station means intermediate the ends of said table including operating mechanism to grasp the end only of a passing board and restrain longitudinal movement while permitting lateral movement thereof, and a plurality of constant rotational speed roller means projecting above said table in spaced relation and arranged intermediate said table first end and said work station to move boards longitudinally toward said work station.

8. A lumber transfer mechanism, comprising an elongated horizontal table having first and second ends, plural parallel lumber transfer means movable longitudinally of said table intermediate the ends thereof, said lumber transfer means carrying laterally aligned lug means which project above said table to contact and move individual boards across said table in a direction laterally of the boards and longitudinally of the table, drive means for moving said chains and lugs at a constant velocity, work station means intermediate the ends of said table for grasping the end only of a passing board and imposing a longitudinal force of preselected magnitude thereto while permitting lateral movement thereof, a plurality of roller means projecting above said table to a lesser height than said lugs intermediate said table first end and said work station to move boards longitudinally toward said work station, and means for rotating individual ones of said rollers at different speeds.

9. In combination with the off-bearing lumber transfer chains and elongated table of a smooth end trimmer saw, said table being horizontal and having first and second ends, a work station intermediate the ends of said table having roller means frictionally and yieldably engageable with the end only of a passing board to impose a longitudinal force thereon in restraint of longitudinal movement of the board, a plurality of constant speed means projecting above said table intermediate said table first end and said work station to move boards longitudinally toward said work station, said constant speed means including rollers having rotational axes parallel the longitudinal dimension of said table with individual ones of the rollers spaced laterally intermediate separate ones of said lumber transfer chains, and a guide fence means projecting above and along one edge of said table from a point opposite said rollers to a point adjacent said work station to stop longitudinal movement while guiding lateral movement of a board toward the work station.

10. A multidirectional lumber transfer mechanism, comprising an elongated horizontal table having first and second ends, plural parallel lumber transfer means extending longitudinally of said table intermediate the ends thereof, said lumber transfer means carrying laterally aligned lug means which project above said table to contact and move individual boards edgewise across said table, drive means for moving said chains and lugs, first and second work station means spaced longitudinally of said table intermediate the ends and adjacent the opposite sides thereof successively to grasp the opposite ends only of a passing board and impose a longitudinal force thereon while permitting lateral movement thereof, a first plurality of roller means projecting above said table to a lesser height than said lugs intermediate said table first end and said first work station to move boards longitudinally toward said first work station, a second plurality of roller means projecting above said table to a lesser height than said lugs intermediate said two work stations to move boards longitudinally away from said first work station and toward said second work station, and means for rotating individual ones of said second rollers at different speeds.

11. A multidirectional lumber transfer mechanism, comprising an elongated horizontal table having first and second ends, plural parallel endless lumber transfer chain means extending longitudinally of said table intermediate the ends thereof, said lumber transfer means carrying laterally aligned lug means which project above said table to contact and move individual boards across said table in a direction laterally of the boards and longitudinally of the table, drive means for moving said chains and lugs at a constant velocity, first and second work station means spaced longitudinally of said table intermediate the ends and adjacent the opposite sides thereof successively to grasp the opposite ends only of a passing board and impose a longitudinal force thereon while permitting lateral movement thereof, a first plurality of constant rotational speed roller means projecting above said table to a lesser height than said lugs intermediate said table first end and said first work station to move boards longitudinally toward said first work station, and a second plurality of roller means projecting above said table to a lesser height than said lugs intermediate said two work stations to move boards longitudinally away from said first work station and toward said second work station, said first and second rollers having rotational axes parallel the longitudinal dimension of said table with individual ones of the rollers spaced laterally intermediate separate ones of said plural lumber transfer means, drive means common to all said second rollers for rotating those rollers closest to said first work station at a high velocity, those closest to said second station at a low velocity and those intermediate thereto at an intermediate velocity, a first guide fence means projecting above and along one edge of said table from a point opposite said first rollers to a point adjacent said first work station to stop longitudinal movement while guiding lateral movement of a board toward the first work station, and a second guide fence means projecting above and along one edge of said table from a point opposite said second rollers to a point adjacent said second work station to stop longitudinal movement while guiding lateral movement of a board toward the second work station.

12. A method for the transfer sequentially in a plurality of directions, of a plurality of elongated boards of random length, comprising moving the boards edgewise at intervals spaced one from another at a constant speed while, at the same time, giving thereto the following longitudinal movement sequentially, acceleration to high speed travel in a first direction followed by deceleration to zero velocity, and, after a preselected interval, acceleration to high speed travel in the opposite direction followed by a step-by-step deceleration to an intermediate speed, a low speed, and, finally, to zero velocity.

13. In the sequential transfer, one by one, of a plurality of elongated boards of random length, the method steps including moving the boards at intervals spaced one from another laterally at a constant speed while, at the same time, moving the boards longitudinally, sequentially, at a high speed, an intermediate speed, a low speed and, finally, zero longitudinal velocity at a point immediately adjacent a station where work is to be performed on the end of the board.

14. In the sequential transfer, to and from successive end work stations, of a plurality of elongated boards of random length, moving the boards laterally at a constant speed while, at the same time, moving each board longitudinally at a speed which varies, sequentially, with high acceleration from zero adjacent the first work station to a preselected high speed and, with low deceleration, back to zero adjacent the next work station so as to prevent physical damage to the boards during said deceleration.

15. A method for the rapid transfer and precise positioning of lumber to allow work to be done upon the opposite ends of each board in succession while the boards move, said method including steps practiced in the following sequence: simultaneously moving a board laterally at a constant speed and longitudinally at a variable speed which decreases to zero as the board approaches a station where work is to be done on the first end thereof; during passage through said station, continuing said constant lateral speed while crowding and pushing the end adjacent the station only toward the station with a preselected force; after said first end work is accomplished, simultaneously moving the board laterally at a constant speed and longitudinally in a direction opposite to the previous longitudinal movement at a variable longitudinal speed which increases rapidly and decreases slowly to zero as the board approaches a station where work is to be done on the second end thereof.

16. A method for the rapid transfer and precise positioning of lumber to allow precision work to be done upon the end of each board while the board is moving, said method including steps practiced in the following sequence: simultaneously moving a board laterally at a constant speed and longitudinally at a variable longitudinal speed which decreases to zero as the end of the board approaches alignment with a station where work is to be done thereon; while continuing said constant lateral speed, grasping said end only and crowding and pushing the board longitudinally toward the station in preselected proportionate opposition to the longitudinal force imposed upon that end by accomplishment of the work to inhibit longitudinal movement away from the station.

17. A method for the rapid transfer and precise positioning of lumber to allow precision work to be done upon the end of each board while the board is moving, said method including steps practiced in the following sequence: moving a board laterally only at a constant speed; thereafter, simultaneously moving the board laterally at a constant speed and longitudinally at a variable speed which first increases and then decreases to zero as the board approaches a station where work is to be done upon the end thereof; while continuing said constant lateral speed, grasping said end only and crowding and pushing the board longitudinally toward the station in preselected proportionate opposition to the longitudinal force imposed upon that end by accomplishment of the work to inhibit longitudinal movement away from the station; after said work is accomplished and while continuing said constant lateral speed, releasing said grasp and moving the board laterally away.

18. A method for the rapid transfer and precise positioning of lumber to allow precision work to be done successively and in sequence as opposed to simultaneously upon the opposite ends of each board while the board is moving, said method including steps practiced in the following sequence: simultaneously moving a board laterally at a constant speed and longitudinally at a variable speed which decreases to zero as a first end of the board approaches alignment with a station where work is to be done thereon; while continuing said constant lateral speed, grasping said first end only and crowding and pushing the board longitudinally toward the station in preselected proportionate opposition to the longitudinal force imposed upon that end by accomplishment of the work to inhibit longitudinal movement away from the station; after said work is accomplished and while continuing said constant lateral speed, releasing said grasp and moving the board longitudinally in a direction opposite to the previous longitudinal movement but at a variable longitudinal speed which increases rapidly and decreases slowly to zero as the second end of the board approaches a second station where work is to be done thereon; while continuing said constant lateral speed, grasping said second end only and crowding and pushing the board longitudinally toward the second station in preselected proportionate opposition to the longitudinal force imposed upon that end by accomplishment of the work to inhibit longitudinal movement away from the second station; after said second work is accomplished and while continuing said constant lateral speed, releasing said grasp and moving the board laterally away.

References Cited in the file of this patent

UNITED STATES PATENTS

| | | |
|---|---|---|
| 1,117,004 | Davis | Nov. 10, 1914 |
| 2,614,706 | Barney et al. | Oct. 21, 1952 |